United States Patent
Baita et al.

(10) Patent No.: US 11,078,307 B1
(45) Date of Patent: Aug. 3, 2021

(54) PROCESS FOR POLYMERIZING OLEFINS IN THE GAS-PHASE

(71) Applicant: Basell Polyolefine GmbH, Wesseling (DE)

(72) Inventors: Pietro Baita, Ferrara (IT); Maurizio Dorini, Ferrara (IT); Giulia Mei, Ferrara (IT); Gerhardus Meier, Houston, TX (US); Giuseppe Penzo, Ferrara (IT); Riccardo Rinaldi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 16/967,387

(22) PCT Filed: Feb. 4, 2019

(86) PCT No.: PCT/EP2019/052624
§ 371 (c)(1),
(2) Date: Aug. 4, 2020

(87) PCT Pub. No.: WO2019/154756
PCT Pub. Date: Aug. 15, 2019

(30) Foreign Application Priority Data

Feb. 7, 2018 (EP) ..................... 18155559

(51) Int. Cl.
*C08F 10/02* (2006.01)
*C08F 2/34* (2006.01)
(Continued)

(52) U.S. Cl.
CPC .............. *C08F 10/02* (2013.01); *C08F 2/001* (2013.01); *C08F 2/01* (2013.01); *C08F 2/34* (2013.01);
(Continued)

(58) Field of Classification Search
CPC .. C08F 10/02; C08F 2/001; C08F 2/01; C08F 10/06; C08L 23/0815; C08L 2207/062
(Continued)

(56) References Cited

U.S. PATENT DOCUMENTS

| 5,990,250 A | 11/1999 | Parrish et al. |
| 6,413,477 B1 | 7/2002 | Govoni et al. |

(Continued)

FOREIGN PATENT DOCUMENTS

| CN | 205170722 U | 4/2016 |
| EP | 2602269 A1 | 6/2013 |

(Continued)

OTHER PUBLICATIONS

The International Search Report and Written Opinion for PCT/EP2019/052624 dated Apr. 12, 2019.

*Primary Examiner* — William K Cheung (57) ABSTRACT

A gas-phase polymerization reactor for the gas-phase polymerization of olefins including a polymerization zone having a recycle line for (a) withdrawing reaction gas from the reactor, (b) leading the reaction gas through a heat-exchanger for cooling, and (c) feeding the reaction gas back to the reactor, wherein the recycle line has the heat-exchanger, a centrifugal compressor having variable guide vanes, and a butterfly valve, and a related process for preparing an olefin polymer in the gas-phase polymerization reactor.

20 Claims, 3 Drawing Sheets

(51) Int. Cl.
*C08F 2/01* (2006.01)
*C08F 10/06* (2006.01)
*C08L 23/08* (2006.01)
*C08F 2/00* (2006.01)

(52) U.S. Cl.
CPC .......... *C08F 10/06* (2013.01); *C08L 23/0815* (2013.01); *C08L 2207/062* (2013.01)

(58) Field of Classification Search
USPC .......................................................... 526/64
See application file for complete search history.

(56) References Cited

U.S. PATENT DOCUMENTS

| | | |
|---|---|---|
| 2010/0282075 A1 | 11/2010 | Force et al. |
| 2010/0317811 A1 | 12/2010 | Mazzucco et al. |
| 2014/0309384 A1* | 10/2014 | Covezzi .............. C08F 110/02 526/65 |

FOREIGN PATENT DOCUMENTS

| | | |
|---|---|---|
| EP | 2674213 A1 | 12/2013 |
| EP | 2722347 A1 | 4/2014 |
| EP | 3137516 A1 | 3/2017 |
| JP | H11140106 A | 5/1999 |
| RU | 2621038 C2 | 5/2017 |
| WO | 9704015 A1 | 2/1997 |
| WO | 9854231 A1 | 12/1998 |
| WO | 0002929 A1 | 1/2000 |
| WO | 2004106388 A2 | 12/2004 |
| WO | 2007071527 A1 | 6/2007 |
| WO | 2010027491 A1 | 3/2010 |
| WO | 2012031986 A1 | 3/2012 |
| WO | 2013083548 A2 | 6/2013 |
| WO | 2016150997 A1 | 9/2016 |

* cited by examiner

PROCESS FOR POLYMERIZING OLEFINS IN THE GAS-PHASE

This application is the U.S. National Phase of PCT International Application PCT/EP2019/052624, filed Feb. 4, 2019, claiming benefit of priority to European Patent Application No. 18155559.0, filed Feb. 7, 2018, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a gas-phase polymerization reactor for the gas-phase polymerization of olefins and a process for preparing an olefin polymer in the gas-phase polymerization reactor.

BACKGROUND OF THE INVENTION

In some instances, gas-phase polymerization processes are for the polymerization of olefins. In some instances, those polymerization processes include homopolymerizing ethylene or propylene or copolymerizing ethylene or propylene with other olefins. In some instances, the reactors for carrying out such gas-phase polymerizations include fluidized-bed reactors, stirred gas-phase reactors or multizone circulating reactors with two distinct interconnected gas-phase polymerization zones. In some instances, the gas phase is made from or containing monomers and comonomers. In some instances, other gaseous components include polymerization diluents, molecular weight modifier, or low-molecular weight reaction products. In some instances, the polymerization diluents are nitrogen or alkanes. In some instances, the molecular weight modifier is hydrogen. In some instances, the products are solid polyolefin particles, formed by polymerization catalyst systems. In some instances, the polymerization catalyst systems are made from or contain particulate catalyst solids.

Olefin gas-phase polymerization processes have large amounts of gas withdrawn from the reaction zone, passed through a heat-exchanger for removing the heat of polymerization and then returned to the polymerization zone. In fluidized-bed reactors, the returned reaction gas maintains the polyolefin particles in fluidized state. In multizone circulating reactors, the circulation between the reactor zones is effected by the returned reaction gas. In some instances, the recycle lines for the reaction gas are equipped with a centrifugal compressor.

In some instances, centrifugal compressors have guide vanes, which are installed at the gas entry of the compressor and direct the gas flow onto the centrifugal impeller. In some instances, the guide vanes are fixed or variable. It is believed that variable guide vanes allow modification of the gas intake angle of the compressor by varying the position of the guide vanes and thereby affecting the gas flow rate. In some instances, this modification also affects the pressure differential across the compressor.

SUMMARY OF THE INVENTION

In a general embodiment, the present disclosure provides a gas-phase polymerization reactor for the gas-phase polymerization of olefins including a polymerization zone having a recycle line for (a) withdrawing reaction gas from the reactor, (b) leading the reaction gas through a heat-exchanger for cooling, and (c) feeding the reaction gas back to the reactor, wherein the recycle line has the heat-exchanger, a centrifugal compressor having variable guide vanes, and a butterfly valve, wherein the variable guide vanes are arranged upstream of the centrifugal compressor and the butterfly valve is arranged downstream of the centrifugal compressor.

In some embodiments, the recycle line has a side line, wherein the side line branches off the recycle line at a position between the centrifugal compressor and the butterfly valve and is equipped with a control valve for controlling the flow rate of the branched-off recycle gas in the side line.

In some embodiments, the butterfly valve has a rotational disc, which has a smaller area than the cross-section of the recycle line at the location of the butterfly valve.

In some embodiments, the butterfly valve is arranged downstream of the heat-exchanger.

In some embodiments, the centrifugal compressor is arranged upstream of the heat-exchanger.

In some embodiments, the recycle line is further equipped with a cyclone upstream of the centrifugal compressor and the heat-exchanger.

In some embodiments, the reactor is a fluidized-bed reactor.

In some embodiments, the reactor is a multizone circulating reactor, wherein a first polymerization zone is a riser, wherein growing polyolefin particles flow upwards under fast fluidization or transport conditions, and a second polymerization zone is a downcomer, wherein the growing polyolefin particles flow downward in a densified form, wherein the riser and the downcomer are interconnected, polyolefin particles leaving the riser enter the downcomer, and polyolefin particles leaving the downcomer enter the riser, thereby establishing a circulation of polyolefin particles through the riser and the downcomer.

In some embodiments, the reactor is part of a reactor cascade.

In some embodiments, the reactor cascade has a first gas-phase reactor and a second gas-phase reactor having a recycle line and a side line, wherein the side line branches off the recycle line of the second gas-phase reactor and serves as a transfer line for transferring polyolefin particles from the first gas-phase reactor to the second gas-phase reactor.

In some embodiments, the present disclosure provides a process for preparing an olefin polymer, including homopolymerizing an olefin or copolymerizing an olefin and one or more other olefins at temperatures of from 20 to 200° C. and pressures of from 0.5 to 10 MPa in the presence of a polymerization catalyst, wherein the polymerization is carried out in the gas-phase polymerization reactor.

In some embodiments, the polymerization is carried out at a pre-determined pressure differential across the centrifugal compressor and variations of the recycle gas flow rate are carried out by varying the position of the guide vanes and the position of the butterfly valve.

In some embodiments, the recycle line has a side line, wherein (a) the side line branches off the recycle line at a position between the centrifugal compressor and the butterfly valve and is equipped with a control valve for controlling the flow rate of the branched-off recycle gas in the side line and (b) the pressure in the side line upstream of the control valve is from 0.01 MPa to 0.2 MPa higher than the pressure in the recycle line downstream of the butterfly valve.

In some embodiments, the polymerization is a homopolymerization of ethylene or a copolymerization of ethylene and one or more other olefins selected from the group consisting of 1-butene, 1-hexene and 1-octene or the polymerization is a homopolymerization of propylene or a copolymerization of propylene and one or more other olefins selected from the group consisting of ethylene, 1-butene and 1-hexene.

In some embodiments, the polyolefin is a high density polyethylene having a density determined according to ISO 1183 at 23° C. from 0.945 to 965 g/cm$^3$.

BRIEF DESCRIPTION OF THE DRAWINGS

The following figures illustrate embodiments of the subject matter disclosed herein. The claimed subject matter may be understood by reference to the following description taken in conjunction with the accompanying figures, in which like reference numerals identify like elements, and in which:

DETAILED DESCRIPTION OF THE INVENTION

In a general embodiment, the present disclosure provides a gas-phase polymerization reactor for the gas-phase polymerization of olefins including a polymerization zone having a recycle line for (a) withdrawing reaction gas from the reactor, (b) leading the reaction gas through a heat-exchanger for cooling, and (c) feeding the reaction gas back to the reactor, wherein the recycle line has a centrifugal compressor and the heat-exchanger. In some embodiments, the reactor is a fluidized-bed reactor, a stirred gas-phase reactor or a multizone circulating reactor with two distinct interconnected gas-phase polymerization zones. In some embodiments, a stirred gas-phase reactor is horizontally or vertically stirred. In some embodiment, the gas-phase polymerization reactor is selected from the group consisting of fluidized-bed reactors and multizone circulating reactors.

Fluidized-bed reactors are reactors, wherein the polymerization takes place in a bed of polyolefin particles which is maintained in a fluidized state by feeding in a reaction gas mixture at the lower end of a reactor and taking off the gas again at the top of the fluidized-bed reactor. In some embodiments, the reaction gas mixture is fed below a gas distribution grid having the function of dispensing the gas flow. The reaction gas mixture is then returned to the lower end of the reactor via a recycle line equipped with a centrifugal compressor and a heat exchanger for removing the heat of polymerization. The flow rate of the reaction gas mixture fluidizes the bed of finely divided polymer present in the polymerization zone and removes the heat of polymerization effectively.

In some embodiments, multizone circulating reactors as as described in Patent Cooperation Treaty Publication Nos. WO 97/04015 A1 and WO 00/02929 A1. In some embodiments, multizone circulating reactors have two interconnected polymerization zones. The first polymerization zone is a riser, wherein growing polyolefin particles flow upward under fast fluidization or transport conditions. The second polymerization zone is a downcomer, wherein the growing polyolefin particles flow downward in a densified form under the action of gravity. The polyolefin particles leaving the riser enter the downcomer and the polyolefin particles leaving the downcomer are reintroduced into the riser, thereby establishing a circulation of polymer between the two polymerization zones. The polymer is passed alternately a plurality of times through these two zones. In such polymerization reactors, a solid/gas separator is arranged above the downcomer to separate the polyolefin and reaction gaseous mixture coming from the riser. The growing polyolefin particles enter the downcomer. The separated reaction gas mixture of the riser is continuously recycled through a gas recycle line to one or more points of reintroduction into the polymerization reactor. In some embodiments, the majority of the recycle gas is recycled to the bottom of the riser. The recycle line is equipped with a centrifugal compressor and a heat exchanger for removing the heat of polymerization. In some embodiments, a line for feeding catalyst or a line for feeding polyolefin particles coming from an upstream reactor is arranged on the riser and a polymer discharge system is located in the bottom portion of the downcomer. In some embodiments, make-up monomers, comonomers, hydrogen, or inert components are introduced at various points along the riser and the downcomer.

In some embodiments, olefins for polymerization in the gas-phase polymerization reactors are 1-olefins. As used herein, the term "1-olefins" refers to hydrocarbons having terminal double bonds, without being restricted thereto. In some embodiments, the olefins are selected from the group consisting of nonpolar olefinic compounds. In some embodiments, the 1-olefins are selected from the group consisting of linear or branched $C_2$-$C_{12}$-1-alkenes, and conjugated and nonconjugated dienes. In some embodiments, the linear $C_2$-$C_{12}$-1-alkenes are linear $C_2$-$C_{10}$-1-alkenes selected from the group consisting of ethylene, propylene, 1-butene, 1-pentene, 1-hexene, 1-heptene, 1-octene, and 1-decene. In some embodiments, the branched $C_2$-$C_{12}$-1-alkene is a branched $C_2$-$C_{10}$-1-alkene. In some embodiments, the branched $C_2$-$C_{10}$-1-alkene is 4-methyl-1-pentene. In some embodiments, conjugated and nonconjugated dienes are selected from the group consisting of 1,3-butadiene, 1,4-hexadiene and 1,7-octadiene. In some embodiments, the olefins for polymerizations are mixtures of various 1-olefins. In some embodiments, the olefins have the double bond as part of a cyclic structure. In some embodiments, the cyclic structures has one or more ring systems. In some embodiments, the olefins having the double bond as a part of a cyclic structure are selected from the group consisting of cyclopentene, norbornene, tetracyclododecene and methylnorbornene. In some embodiments, the olefins having the double bond as a part of a cyclic structure are dienes selected from the group consisting of 5-ethylidene-2-norbornene, norbornadiene and ethylnorbornadiene. In some embodiments, the olefins for polymerizations are mixtures of two or more olefins.

In some embodiments, the gas-phase polymerization reactors are for the homopolymerization or copolymerization of ethylene or propylene. In some embodiments, the gas-phase polymerization reactors are for the homopolymerization or copolymerization of ethylene. In some embodiments, the comonomers in propylene polymerization are up to 40 wt. % of ethylene, 1-butene or 1-hexene, alternatively from 0.5 wt. % to 35 wt. % of ethylene, 1-butene or 1-hexene. In some embodiments, the comonomers in ethylene polymerization are up to 20 wt. % $C_3$-$C_8$-1-alkenes, alternatively from 0.01 wt. % to 15 wt. %, alternatively from 0.05 wt. % to 12 wt. %. In some embodiments, the $C_3$-$C_8$-1-alkenes are selected from the group consisting of 1-butene, 1-pentene, 1-hexene and 1-octene. In some embodiments, the comonomers in ethylene polymerizations are from 0.1 wt. % to 12 wt. % of 1-hexene or 1-butene.

In some embodiments, the gas-phase reactors have a recycle line equipped with a centrifugal compressor and a butterfly valve. In some embodiments, the centrifugal compressor has variable guide vanes. The variable guide vanes are arranged upstream of the centrifugal compressor and the butterfly valve is arranged downstream of the centrifugal compressor. The variable guide vanes of the compressor allow modification of the gas intake angle of the compressor, thereby influencing the gas flow rate and the differential pressure. It is believed that increasing the guide vanes opening increases the gas flow rate and the differential pressure. Correspondingly, it is believed that decreasing the guide vanes opening decreases the gas flow rate and the differential pressure. In some embodiments, the butterfly valve also influences the gas flow rate and the differential pressure within the recycle line. In some embodiments, butterfly valves are flow control devices having a rotational disk installed within a passageway. In some embodiments, the rotational disk is installed within a tubing of the recycle line. By increasing the butterfly valve opening, the gas flow rate increases and the differential pressure across the compressor decreases. Correspondingly, decreasing the butterfly valve opening decreases the gas flow rate and increases the differential pressure across the compressor. In some embodiments, simultaneous adjustments simultaneously increase fluidization gas flow rate while maintaining the same differential pressure across the compressor.

In some embodiments, the butterfly valve has sharp edges and avoids corners within the butterfly valve. It is believed that these embodiments minimize the risk of catalytically active particles entrained with the recycle gas adhering to the butterfly valve.

In some embodiments, the butterfly valve has a rotational disc having an area smaller than the cross-section of the recycle line at the location of the butterfly valve. As such, when the butterfly valve is in fully closed position, the gas flow is not fully blocked. The butterfly valve is fully closed when the rotational disc is positioned perpendicular to the gas flow. In some embodiments, the area of the rotational disc is from 90% to 99% of the cross-section of the recycle line at the location of the butterfly valve, alternatively from 94% to 98% of the cross-section of the recycle line at the location of the butterfly valve. In some embodiments, the rotational disc is circular and the non-blocked area of the recycle line at the location of the butterfly valve in closed position forms an annular gap around the rotational disc. In some embodiments, the rotational disc is centrically fixed and rotates around an axis running through the center of the rotational disc. In some embodiments, the butterfly valve is arranged at a location of the recycle line where the recycle line has no restriction.

In some embodiments, the recycle line has a side line and the side line branches off the recycle line at a position between the centrifugal compressor and the butterfly valve and the side line is equipped with a control valve for controlling the flow rate of the branched-off recycle gas in the side line. In some embodiments, the design of the gas-phase polymerization reactors allows the side line to operate with a predetermined differential pressure across the control valve independently from the recycle gas flow rate. In some embodiments, the control valve operates in a predetermined control range. In some embodiments, the control range includes a wide valve opening to minimize the risk of fouling due to entrained small particles.

In some instances and when controlling the flow of the recycle gas in the recycle line only with variable guide vanes and not with a combination of variable guide vanes and a further control valve such as a butterfly valve downstream of the branching-off position of the side line, a reactor situation which needs a reduced flow rate of the recycle gas in the recycle line would result in a reduced differential pressure across the compressor and induce a reduced differential pressure across the control valve. In some instances, the reactor situation is a start-up of the gas-phase polymerization. It is believed that the further opening of the control valve is necessary to maintain an intended gas flow through the side line, thereby risking the operation of the control valve outside of the optimal control range. In some instances and when the design of the control valve is different, the operation of the control valve is not in an optimal control range unless the flow rate of the recycle gas is reduced. In some instances, a reduced differential pressure across the compressor is insufficient for the recycle gas branched off into the side line to act as transportation gas or carrier gas.

It is believed that a partial fouling of equipment in the gas cycle is compensated by a wider opening of the butterfly valve without having changes in the differential pressures across the control valves in the side lines. In some embodiments, the partial fouling of equipment in the gas cycle is partial fouling of the heat exchanger or partial fouling of a gas distribution grid. It is believed that without a control valve such as a butterfly valve downstream of the branching-off position of the side line, an opening of the compressor guide vanes is necessary, resulting in a higher pressure downstream of the compressor and implying a risk that the control valves could leave the optimal control range.

In some embodiments, the heat exchanger is arranged at various positions of the recycle line. In some embodiments, the heat exchanger is installed upstream of the variable guide vanes and the centrifugal compressor. In some embodiments, the heat exchanger is arranged between the centrifugal compressor and butterfly valve. In some embodiments, the heat exchanger is installed downstream of the butterfly valve. In some embodiments, the butterfly valve is arranged downstream of the heat-exchanger.

In some embodiments, the centrifugal compressor is arranged upstream of the heat-exchanger.

In some embodiments, the recycle line is further equipped with a cyclone upstream of the centrifugal compressor and the heat-exchanger.

In some embodiments, the gas-phase polymerization reactor is a fluidized-bed reactor equipped with a circulation loop connected to the gas distribution grid for recycling polyolefin particles from the gas distribution grid to the upper region the fluidized-bed reactor. In some embodiments, the carrier gas for conveying the polyolefin particles through the circulation loop is recycle gas which is provided by a side line which branches off the recycle line. In some embodiments, the fluidized-bed reactors are as described in Patent Cooperation Treaty Publication No. WO 2007/071527 A1. It is believed that equipping the recycle line with both a centrifugal compressor having variable guide vanes and a butterfly valve permits reducing the flow rate of the recycle gas and maintaining a differential pressure across the side line branching off the recycle line for pneumatically transporting the polyolefin particles in the circulation loop. In some embodiments, the equipped recycle line reduces the carry-over of fines in the start-up phase.

Figure 1:
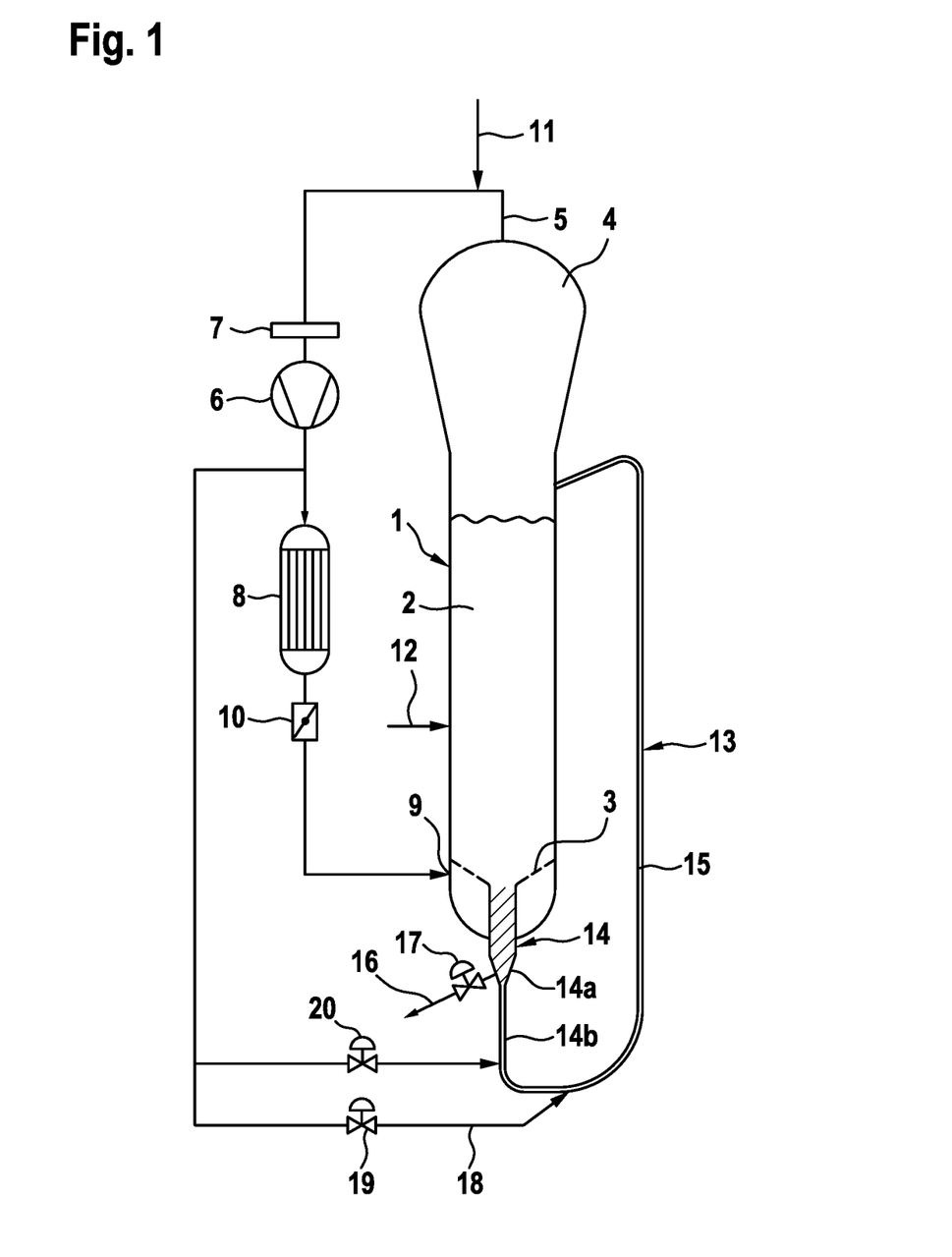
FIG. 1 shows a schematic of a fluidized-bed reactor.

FIG. 1 shows a schematic of a fluidized-bed reactor.

In some embodiments, the fluidized-bed reactor (1) has a fluidized bed (2) of polyolefin particles, a gas distribution grid (3) and a velocity reduction zone (4). In some embodiments, the velocity reduction zone (4) has an increased diameter compared to the diameter of the fluidized-bed portion of the reactor. The polyolefin bed is kept in a fluidization state by an upwardly flow of gas fed through the gas distribution grid (3) placed at the bottom portion of the reactor (1). The gaseous stream of the reaction gas leaving the top of the velocity reduction zone (4) via recycle line (5) is compressed by centrifugal compressor (6) having variable guide vanes (7), transferred to a heat exchanger (8), wherein the gaseous stream is cooled, and then recycled to the bottom of the fluidized-bed reactor (1) at a point below the gas distribution grid (3) at position (9). The recycle line (5) further has a butterfly valve (10) downstream of heat exchanger (8). In some embodiments, make-up monomers, molecular weight regulators, or optional inert gases are fed into the reactor (1) at various positions. In some embodiments, make-up monomers, molecular weight regulators, or optional inert gases are fed via line (11) upstream of the compressor (6). In some embodiments, the catalyst is fed into the reactor (1) via a line (12). In some embodiments, line (12) is placed in the lower part of the fluidized bed (2).

The fluidized-bed reactor (1) is provided with a continuous pneumatic recycle of polyolefin particles by a circulation loop (13) connecting the gas distribution grid (3) to the upper region of the fluidized-bed reactor (1). The circulation loop (13) has the upper opening of a settling pipe (14) integrated into the gas distribution grid (3). In some embodiments, the settling pipe (14) is arranged vertically. The settling pipe (14) has a section of higher diameter (14a) and a section of lower diameter (14b). The gas distribution grid (3) is endowed with a conical shape that downwardly inclines towards the settling pipe (14), thereby fostering the entry of the polyolefin particles into the settling pipe (14) under gravity. In some embodiments, the upper opening of the settling pipe (14) is located in a central position with respect to the gas distribution grid (3). The lower part of the settling pipe (14) is connected to a pneumatic conveyor pipe (15), which reintroduces the polyolefin particles into the fluidized-bed reactor (1). In some embodiments, the outlet of the pneumatic conveyor pipe (15) is placed above the polymer bed (2) and below the velocity reduction zone (4).

The discharge of polyolefin particles from the fluidized-bed reactor (1) occurs through discharge conduit (16) which is attached to the settling pipe section of higher diameter (14a). A control valve (17) is installed in discharge conduit (16) in proximity of settling pipe (14) for adjusting the flow rate of the polyolefin particles discharged from the fluidized-bed reactor (1) into the discharge conduit (16). The discharge of the polyolefin particles is carried out continuously and the opening of the control valve (17) is adjusted, thereby maintaining the level of polyolefin particles inside the fluidized-bed reactor (1).

The control valve (17) is placed in correspondence of a restriction in the settling pipe (14) existing between the section of higher diameter (14a) and the section of lower diameter (14b).

The polyolefin particles not discharged through the discharge conduit (16) are recycled to the upper region of the fluidized-bed reactor (1) by the circulation loop (13).

The carrier gas for transporting the polyolefin particles through the pneumatic conveyor pipe (15) is taken from the gas recycle line at a point downstream the compressor (6) and upstream the heat exchanger (8), thereby exploiting the pressure drop through the heat exchanger (8), butterfly valve (10), the distribution grid (3) and the polymer bed (2). The carrier gas is predominantly fed via line (18) at the inlet of the conveyor pipe (15). The flow rate of the polyolefin particles recycled through the circulation loop (13) is regulated by control valves (19) and (20), which adjust the flow rate of the carrier gas entering the conveyor pipe (15).

In some embodiments, the recycle gas velocity in the starting phase is reduced in comparison to the recycle gas velocity in steady-stated operation while the differential pressure is the same across the compressor. It is believed that these embodiments permit a reduction in the carry-over of fines in the starting phase and provide carrier gas for circulation of the polyolefin particles through the pneumatic conveyor pipe.

In some embodiments, the gas-phase polymerization reactor is a multizone circulating reactor having a downcomer which is equipped at the bottom with a throttling valve. This valve is employed for controlling the flow of the growing polyolefin particles from the downcomer into the riser. In some embodiments, the throttling valve is a mechanical valve. In some embodiments, the mechanical valve is a simple or double butterfly valve or a ball valve. A stream of a gas is fed into the lower part of the downcomer at a position shortly above the valve to facilitate the flow of the growing polyolefin particles through the valve. As used herein, the stream of gas is sometimes denoted as "dosing gas." In some embodiments, the opening of the valve or the flow rate of the dosing gas is varied, thereby adjusting the velocity of the polyolefin particles within the downcomer. A further stream of a gas is fed below the downcomer into the part of the multizone circulating reactor connecting the downcomer with the riser for conveying the polyolefin particles from the bottom of the downcomer to the riser. As used herein, the further stream of a gas is sometimes denoted as "transport gas." The dosing gas and the transport gas are from the recycle gas provided by a side line which branches off the recycle line. In some embodiments, the multizone circulating reactors are as described in Patent Cooperation Treaty Publication No. WO 2012/031986 A1. Equipping the recycle line with both a centrifugal compressor having variable guide vanes and a butterfly valve permits reducing the flow rate of the recycle gas while maintaining a differential pressure across the side line branching off the recycle line for dosing gas and transport gas to control the flow of polyolefin particles in the downcomer and the transportation of polyolefin particles from the downcomer to the riser. In some embodiments, the equipped recycle line reduces the carry-over of fines in the start-up phase.

Figure 2:
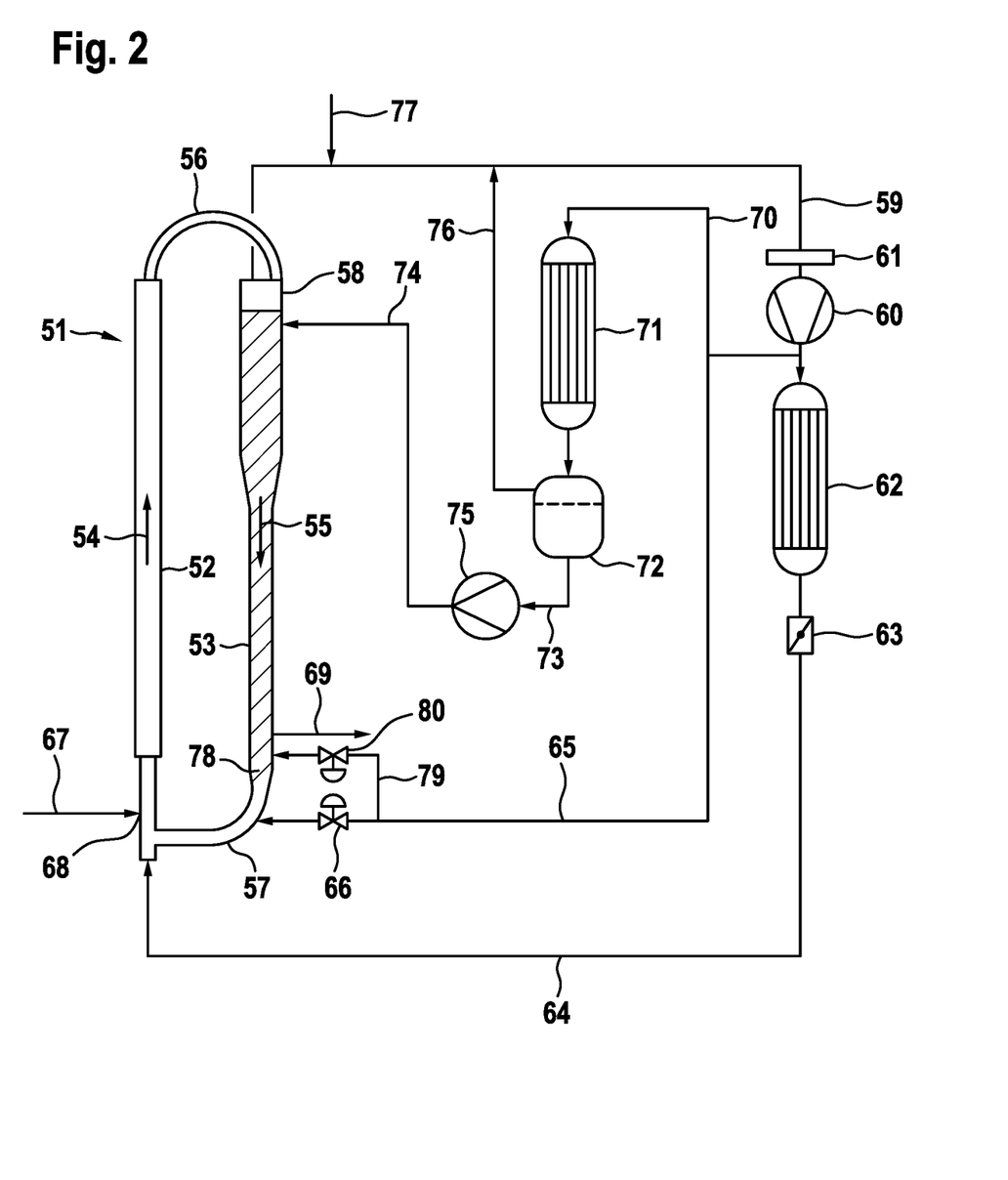
FIG. 2 shows a schematic of a multizone circulating reactor.

FIG. 2 shows a schematic of a multizone circulating reactor.

In some embodiments, the multizone circulating reactor (51) has, as first reaction zone, a riser (52) and, as second reaction zone, a downcomer (53) which are repeatedly passed by the polyolefin particles. Within riser (52), the polyolefin particles flow upward under fast fluidization conditions along the direction of arrow (54). Within the downcomer (53), the polyolefin particles flow downward under the action of gravity along the direction of the arrow (55). The riser (52) and the downcomer (53) are appropriately interconnected by the interconnection bends (56) and (57).

After flowing through the riser (52), the polyolefin particles and the reaction gas mixture leave riser (52) and are conveyed to a solid/gas separation zone (58). In some embodiments, the solid/gas separation is effected by a centrifugal separator like a cyclone. From the separation zone (58), the polyolefin particles enter downcomer (53).

The reaction gas mixture leaving the separation zone (58) is recycled to the riser (52) by a recycle line (59), equipped with a centrifugal compressor (60) having variable guide vanes (61) and a heat exchanger (62). Downstream of heat exchanger (62), the recycle line (59) also has a butterfly valve (63). Between the compressor (60) and the heat exchanger (62), the recycle line (59) splits and the gaseous mixture is divided into two separated streams: (i) line (64) conveys a part of the recycle gas through the heat exchanger (62) and the butterfly valve (63) to the bottom of riser (52), thereby establishing fast fluidization conditions therein and (ii) line (65) conveys another part of the recycle gas into the interconnection bend (57). For controlling the flow rate of the transport gas through line (65) into the interconnection bend (57), line (65) is equipped with a control valve (66).

In some embodiments, a suspension of a solid catalyst component is fed via line (67) to a catalyst injection point (68) of the multizone circulating reactor (51). In some embodiments and when the multizone circulating reactor (51) is operated as a downstream reactor in a cascade of gas-phase reactors, a stream of growing polyolefin particles from a previously arranged gas-phase reactor is fed via line (67) to a polymer injection point (68). The polyolefin particles obtained in the multizone circulating reactor (51) are continuously discharged from the bottom part of the downcomer (53) via the discharge line (69).

A part of the gaseous mixture leaving the separation zone (58) exits the recycle line (59) after having passed the compressor (60) and is sent through line (70) to the heat exchanger (71), where the part of the gaseous mixture is cooled to a temperature at which the monomers and the optional inert gas are partially condensed. A separating vessel (72) is placed downstream of the heat exchanger (71). The separated liquid is withdrawn from the separating vessel (72) via line (73) and fed to downcomer (53) through line (74) by a pump (75), thereby generating the barrier for preventing the reaction gas mixture of the riser (52) from entering the downcomer (53). The gaseous mixture obtained as gas-phase in the separating vessel (72) is recirculated to recycle line (59) through line (76). In some embodiments, make-up monomers, make-up comonomers, and optionally inert gases or process additives are introduced into the recycle line (59) via line (77).

The bottom of the downcomer (53) is equipped with a butterfly valve (78) having an adjustable opening for adjusting the flow of polyolefin particles from downcomer (53) through interconnection bend (57) into the riser (52). Above the butterfly valve (78), amounts of a recycle gas mixture coming from the recycle line (59) through line (79) are introduced as dosing gas into the downcomer (53), thereby facilitating the flow of the polyolefin particles through butterfly valve (78). For controlling the flow rate of the dosing gas, line (79) is equipped with a control valve (80).

In some embodiments, the gas-phase polymerization reactor is part of a reactor cascade. In some embodiments, the reactor cascade has a first gas-phase reactor and a subsequent second gas-phase reactor having a side line, wherein the side line branches off the recycle line of the second gas-phase reactor and serves as the transfer line for transferring polyolefin particles from the first gas-phase reactor to the second gas-phase reactor. The transfer of polyolefin particles from the first gas-phase reactor to the second gas-phase reactor then occurs by a stream of a gas, which is recycle gas of the second gas-phase reactor. As used herein, the stream of gas is sometimes denoted as "pick-up gas." In some embodiments, the reactor cascade is as described in Patent Cooperation Treaty Publication No. WO 2013/0853548 A1. It is believed that equipping the recycle line of the second gas-phase reactor with both a centrifugal compressor having variable guide vanes and a butterfly valve permits reducing the flow rate of the recycle gas and maintaining a differential pressure across the side line branching off the recycle line for (i) pneumatically transporting the polyolefin particles from the first gas-phase reactor of the reactor cascade to the second gas-phase reactor of the reactor cascade and (ii) emptying the transfer line when the discharge of polyolefin particles from the first gas-phase reactor of the reactor cascade is interrupted or terminated. In some embodiments, the equipped recycle line reduces the carry-over of fines in the start-up phase.

Figure 3:
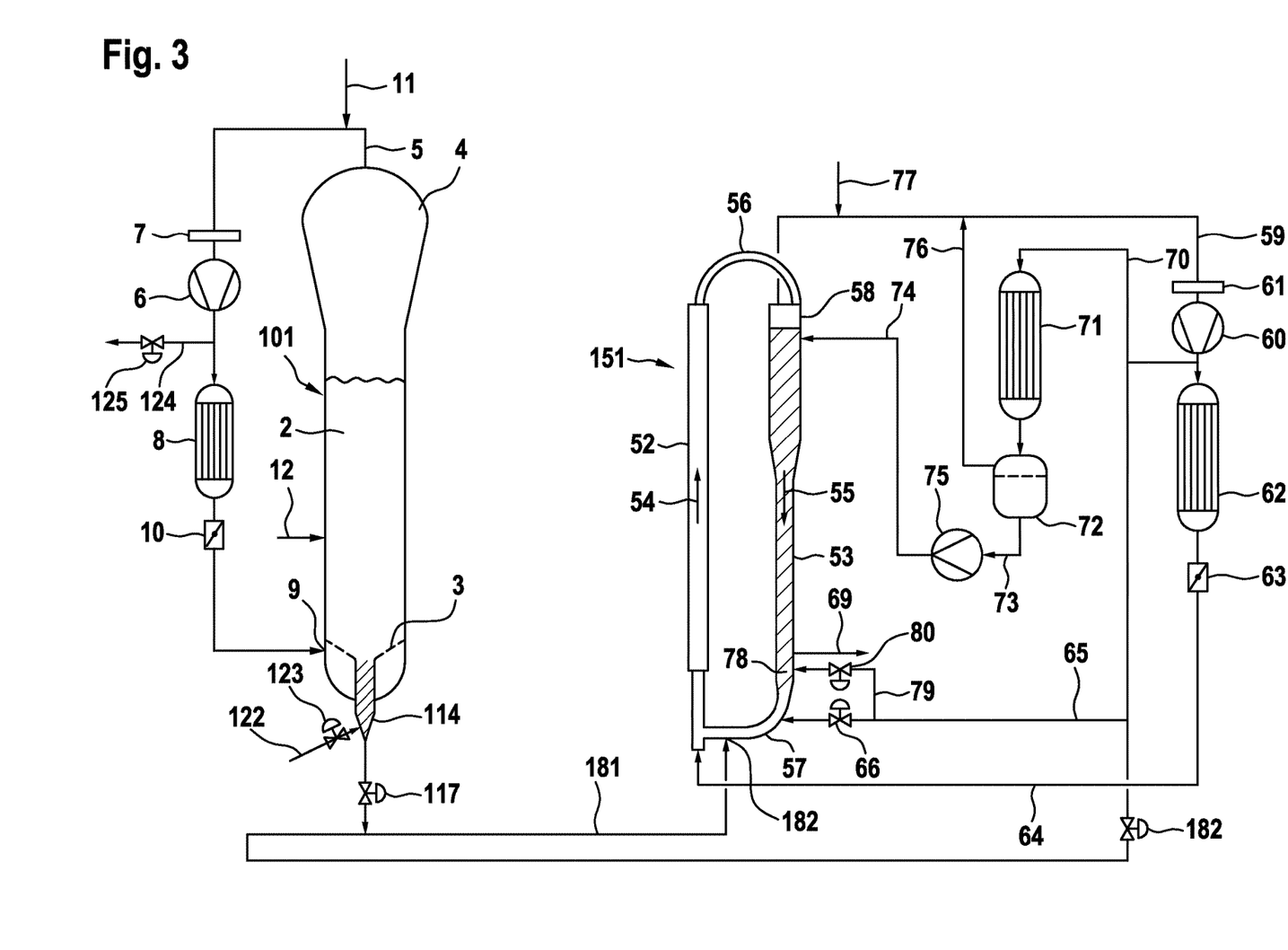
FIG. 3 shows a schematic of a cascade of two serially connected gas-phase reactors.

FIG. 3 shows a schematic of a cascade of two serially connected gas-phase reactors.

In some embodiments, the fluidized-bed reactor (101) shown in FIG. 3 is similar to the fluidized-bed reactor (1) shown in FIG. 1 and the multizone circulating reactor (151) shown in FIG. 3 is similar to the multizone circulating reactor (51) shown in FIG. 2.

The fluidized-bed reactor (101) differs from the fluidized-bed reactor (1) in that the fluidized-bed reactor (101) does not have a circulation loop (13). Instead, the settling pipe (114) is closed at the lower end by a discharge valve (117). In some embodiments, the discharge valve (117) is a segmental ball valve. The bed of polyolefin particles contained in the settling pipe (114) during operation of fluidized-bed reactor (101) enters the upper opening of the settling pipe (114) integrated into the gas distribution grid (3) and moves from top to bottom of the settling pipe. Discharge valve (117) is arranged above a line (181) which branches off the line (65) of the multizone circulating reactor (151) and carries a part of the recycle gas of multizone circulating reactor (151). For controlling the flow rate of the pick-up gas through line (181), line (181) is equipped with a control valve (182). The polyolefin particles having passed discharge valve (117) enter the line (181) and are transported by the pick-up gas to the multizone circulating reactor (151).

The settling pipe (114) is further equipped with a line (121) for introducing a fluid that induces an upward stream of the fluid in the bed of polyolefin particles within the settling pipe (114). In some embodiments, the line (121) is at a position near the lower end of the settling pipe (114). In some embodiments, the reaction gas mixture of the fluidized-bed reactor (101) is prevented from entering the line (181) and thereby from entering the multizone circulating reactor (151). The flow of the fluid in line (121) is controlled by a control valve (122). In some embodiments and to compensate for the part of the fluid introduced into settling pipe (114) through line (121) which enters the fluidized-bed reactor (101) through settling pipe (114), a portion of the reaction gas within fluidized-bed reactor (101) is withdrawn. In some embodiments, the portion of the reaction gas is withdrawn through withdrawal line (124), which branches off recycle line (5) between the centrifugal compressor (6) and the heat exchanger (8). The gas flow through withdrawal line (124) is controlled by a control valve (125). In some embodiments, the reaction gas withdrawn through line (124) is transferred to a work-up section (not shown in FIG. 3).

In some embodiments, the present disclosure further provides a process for preparing an olefin polymer including homopolymerizing an olefin or copolymerizing an olefin and one or more other olefins at temperatures of from 20 to 200° C. and pressures of from 0.5 to 10 MPa in the presence of a polymerization catalyst, wherein the polymerization is carried out in a gas-phase polymerization reactor.

In some embodiments, the polymerization is a homopolymerization of ethylene or a copolymerization of ethylene and one or more other olefins selected from the group consisting of 1-butene, 1-hexene and 1-octene or the polymerization is a homopolymerization of propylene or a copolymerization of propylene and one or more other olefins selected from the group consisting of ethylene, 1-butene and 1-hexene. In some embodiments, the resulting polyolefin is a high density polyethylene having a density determined according to ISO 1183 at 23° C. from 0.945 to 965 g/cm³.

In some embodiments, the gas-phase polymerization reactors are operated at pressures of from 0.5 MPa to 10 MPa, alternatively from 1.0 MPa to 8 MPa, alternatively from 1.5 MPa to 4 MPa, wherein these pressures are absolute pressures, which is pressure having the dimension MPa (abs). In some embodiments, the polymerization is carried out at temperatures of from 30° C. to 160° C., alternatively from 65° C. to 125° C. In some embodiments, the temperatures are in the upper part of this range for preparing ethylene copolymers having high density. In some embodiments, the temperatures are in the lower part of this range for preparing ethylene copolymers having lower density.

In some embodiments, the polymerization in the gas-phase polymerization reactors is carried out in a condensing or super-condensing mode, wherein part of the circulating reaction gas mixture is cooled to below the dew point and returned to the reactor either separately as a liquid and a gas-phase or together as a two-phase mixture, thereby making additional use of the enthalpy of vaporization for cooling the reaction gas. In some embodiments and when operating in a condensing or super-condensing mode, the gas-phase polymerization reactor is a fluidized-bed reactor.

In some embodiments, the polymerization is carried out in the presence of an inert gas. In some embodiments, the inert gas is nitrogen, an alkane having from 1 to 10 carbon atoms, or mixtures thereof. In some embodiments, the alkane having from 1 to 10 carbon atoms is selected from the group consisting of methane, ethane, propane, n-butane, isobutane, n-pentane, isopentane or n-hexane. In some embodiments, nitrogen or propane is used as inert gas In some embodiments, nitrogen or propane is used in combination with further alkanes. In some embodiments, the polymerization is carried out in the presence of a $C_3$-$C_5$ alkane as polymerization diluent. In some embodiments, the $C_3$-$C_5$ alkane is propane. In some embodiments, the $C_3$-$C_5$ alkane is propane in the case of homopolymerization or copolymerization of ethylene. The reaction gas mixtures within the reactor additionally are made from or containing the olefins to be polymerized. In some embodiments, the reaction gas mixtures are made from or containing a main monomer and one or more optional comonomers. In some embodiments, the reaction gas mixture has a content of inert components from 30 to 99 vol. %, alternatively from 40 to 95 vol. %, alternatively from 45 to 85 vol. %. In some embodiments, the main monomer is propylene without any inert diluent. In some embodiments, the inert diluent is added in a minor amount. In some embodiments, the reaction gas mixture is further made from or containing additional components. In some embodiments, the additional components are antistatic agents or molecular weight regulators. In some embodiments, the molecular weight regulator is hydrogen. In some embodiments, the components of the reaction gas mixture are fed into the gas-phase polymerization reactor or into the recycle line in gaseous form or as liquid which then vaporizes within the reactor or the recycle line.

In some embodiments, the polymerization of olefins is carried out using olefin polymerization catalysts. In some embodiments, the olefin polymerization catalysts are Phillips catalysts based on chromium oxide, Ziegler- or Ziegler-Natta-catalysts, or single-site catalysts. As used herein, the term "single-site catalysts" refers to catalysts based on chemically uniform transition metal coordination compounds. In some embodiments, mixtures of two or more of these catalysts are used for the polymerization of olefins. As used herein, the term "mixed catalysts" can refer to hybrid catalysts.

In some embodiments, the catalysts are of the Ziegler type. In some embodiments, the Ziegler-type catalysts are made from or contain a compound of titanium or vanadium, a compound of magnesium and optionally an electron donor compound and/or a particulate inorganic oxide as a support material.

In some embodiments, the catalysts of the Ziegler type are used in the presence of a cocatalyst. In some embodiments, the cocatalysts are organometallic compounds of metals of Groups 1, 2, 12, 13 or 14 of the Periodic Table of Elements, alternatively organometallic compounds of metals of Group 13, alternatively organoaluminum compounds. In some embodiments, cocatalysts are organometallic alkyls, organometallic alkoxides, or organometallic halides.

In some embodiments, the organometallic compounds are selected from the group consisting of lithium alkyls, magnesium or zinc alkyls, magnesium alkyl halides, aluminum alkyls, silicon alkyls, silicon alkoxides and silicon alkyl halides. In some embodiments, the organometallic compounds are selected from the group consisting of aluminum alkyls and magnesium alkyls. In some embodiments, the organometallic compounds are made from or containing aluminum alkyls, alternatively trialkylaluminum compounds or compounds of this type in which an alkyl group is replaced by a halogen atom. In some embodiments, the halogen is chlorine or bromine. In some embodiments, the aluminum alkyls are selected from the group consisting of trimethylaluminum, triethylaluminum, tri-isobutylaluminum, tri-n-hexylaluminum, diethylaluminum chloride, and mixtures thereof.

In some embodiments, the catalysts are Phillips-type chromium catalyst. In some embodiments, the Phillips-type chromium catalyst is prepared by applying a chromium compound to an inorganic support and subsequently activating the catalyst precursor at temperatures in the range from 350 to 1000° C., resulting in chromium present in valences lower than six being converted into the hexavalent state. In some embodiments and apart from chromium, further elements are used. In some embodiments, the further elements are selected from the group consisting of magnesium, calcium, boron, aluminum, phosphorus, titanium, vanadium, zirconium, zinc, and mixtures thereof. In some embodiments, the further elements are selected from the group consisting of titanium, zirconium and zinc. In some embodiments, the catalyst precursor is doped with fluoride prior to or during activation. In some embodiments, supports for Phillips-type catalysts are selected from the group consisting of aluminum oxide, silicon dioxide (silica gel), titanium dioxide, zirconium dioxide, mixed oxides or cogels, and aluminum phosphate. In some embodiments, the support materials are obtained by modifying the pore surface area. In some embodiments, the modification uses compounds of the elements boron, aluminum, silicon or phosphorus. In some embodiments, the modification uses a silica gel. In some embodiments, the modification uses spherical or granular silica gels. In some embodiments, the spherical silica gels are spray dried. In some embodiments, the activated chromium catalysts is subsequently prepolymerized or prereduced. In some embodiments, the prereduction is carried out by cobalt or hydrogen at 250° C. to 500° C., alternatively at 300° C. to 400° C., in an activator.

In some embodiments, the polymerization is carried out at a pre-determined differential pressure across the centrifugal compressor and variations of the recycle gas flow rate are carried out by varying the position of the guide vanes and the position of the butterfly valve.

In some embodiments, the recycle line of the gas-phase reactor has a side line, wherein (a) the side line branches off the recycle line at a position between the centrifugal compressor and the butterfly valve and is equipped with a control valve for controlling the flow rate of the branched-off recycle gas in the side line and (b) the pressure in the side line upstream of the control valve is from 0.01 MPa to 0.2 MPa higher than the pressure in the recycle line downstream of the butterfly valve, alternatively from 0.02 MPa to 0.1 MPa higher than the pressure in the recycle line downstream of the butterfly valve.

In some embodiments, the polymerization is a polymerization in a gas-phase reactor which is part of a cascade of polymerization reactors. In some embodiments, one or more polymerizations in other gas-phase reactors of the cascade of polymerization reactors are polymerizations according to the present disclosure. In some embodiments, combinations of the polymerizations reactors include a fluidized-bed reactor followed by a multizone circulating reactor, a multizone circulating reactor followed by a fluidized-bed reactor, a cascade of two or three fluidized-bed reactors, and one or two loop reactors followed by one or two fluidized-bed reactors.

EXAMPLES

The melt flow rate $MFR_{1902.16}$ was determined according to DIN EN ISO 1133-1:2012-03 at a temperature of 190° C. under a load of 2.16 kg.

The density was determined according to DIN EN ISO 1183-1:2004, Method A (Immersion) with compression molded plaques of 2 mm thickness. The compression molded plaques were prepared with a defined thermal history: pressed at 180° C., 20 MPa for 8 min with subsequent crystallization in boiling water for 30 min.

Comparative Example A

A fluidized-bed reactor having the configuration shown in FIG. 1, including a centrifugal compressor having variable guide vanes but without having a butterfly valve installed in the recycle line downstream of the heat-exchanger, was used to carry out the gas-phase polymerization of Comparative Example A. The design parameters of the fluidized-bed reactor were the following:
Diameter of the reactor: 4.0 m
Diameter of the circulation loop: 0.2 m
Conical shape of the fluidization grid with a bottom apex.
The fluidized-bed reactor was designed to be operated with a fluidization velocity within the fluidized-bed reactor of 0.9 m/s.

A Ziegler-Natta catalyst was prepared as described in Example 13 of Patent Cooperation Treaty Publication No. WO 2004/106388 A1 with a molar feed ratio of electron donor/Ti of 8. 1.2 kg/h of the Ziegler-Natta catalyst were fed using 25 kg/h of liquid propane to a first stirred precontacting vessel. Triisobutylaluminum (TIBA), diethylaluminum chloride (DEAC) and tetrahydrofuran (THF) were also dosed to the precontacting vessel. The weight ratio of triisobutylaluminum to diethylaluminum chloride was 7:1. The weight ratio of the aluminum alkyls to the catalyst solid was 10:1. The weight ratio of the aluminum alkyls to THF was 10:1. The first precontacting vessel was kept at 50° C. with a residence time of 10 minutes. The catalyst suspension of the first precontacting vessel was continuously transferred to a second stirred precontacting vessel, which was also operated at 50° C. with a residence time of 60 minutes. The activated catalyst suspension was then continuously introduced into the fluidized-bed reactor.

The production of a polyethylene was started with an empty reactor, that is, with a reactor absent polyolefin particles. The fluidization velocity within the fluidized-bed reactor was set to 0.9 m/s. 24 hours after the catalyst feed to the first precontacting vessel had been started, the fluidized-bed reactor was in steady state. The fluidized-bed reactor was operating at an absolute pressure of 25 bar and a temperature of 80° C. The pressure differential across the centrifugal compressor was 0.2 MPa. The reaction gas had the following composition:
ethylene=24 mole-%; 1-butene=14 mole-%; $H_2$=5.5 mole-%; ethane=1 mole-%;
propane=55.5 mole-%. The plant throughput was 16 t/h, catalyst productivity was 10 000 g polyethylene/g catalyst; and the residence time was 2.8 h.

The resulting polyethylene had an $MFR_{1902/2.16}$ of 0.95 g/10 min and a density of 0.9185 g/cm$^3$.

After two days of steady-state operation, a slight decrease in the efficiency of the heat-exchanger was observed. The polymerization was terminated, and the recycle system was inspected. Wall layers of polymer were detected in the pipes of the heat-exchanger and on the wall of the recycle line upstream of the heat exchanger. Further, chunks were observed within the heat-exchanger on top of the heat-exchanger pipes.

Comparative Example B

After cleaning of the polymerization reactor, the polymerization of Comparative Example A was repeated; however, the fluidized-bed reactor was started up with a fluidization velocity within the fluidized-bed reactor of 0.7 m/s to reduce the carry-over into the recycle line. This resulted in a pressure differential across the centrifugal compressor of 0.1 MPa. 12 hours after the start-up. The circulation loop was plugged, indicating insufficient circulation of polyolefin particles in the circulation loop.

Example 1

After cleaning of the polymerization reactor and modification of the fluidized-bed reactor, the polymerization of Comparative Example A was repeated. The modified polymerization reactor had the configuration shown in FIG. 1 including a recycle line equipped with a centrifugal compressor having variable guide vanes and a butterfly valve installed downstream of the heat exchanger.

The fluidized-bed reactor was started up and operated with a fluidization velocity within the fluidized-bed reactor of 0.75 m/s, with a partly closed butterfly valve, thereby providing pressure differential across the centrifugal compressor of 0.2 MPa. No plugging of the circulation loop was observed.

The polymerization was continued for a week without any plugging of the circulation loop or of the reactor discharge system. The plant was then shut down as per schedule. The subsequent inspection of the recycle system showed a clean recycle line and a clean heat exchanger without any surface layers of polymer.

The invention claimed is:

1. A gas-phase polymerization reactor for the gas-phase polymerization of olefins comprising:
a polymerization zone having a recycle line for
(a) withdrawing reaction gas from the reactor,
(b) leading the reaction gas through a heat-exchanger for cooling and
(c) feeding the reaction gas back to the reactor,
wherein the recycle line has
the heat-exchanger,
a centrifugal compressor comprising variable guide vanes, and
a butterfly valve,
wherein the variable guide vanes are arranged upstream of the centrifugal compressor and the butterfly valve is arranged downstream of the centrifugal compressor.

2. The reactor of claim 1, wherein the recycle line has a side line,
wherein the side line branches off the recycle line at a position between the centrifugal compressor and the butterfly valve and is equipped with a control valve for controlling the flow rate of the branched-off recycle gas in the side lines.

3. The reactor of claim 1, wherein the butterfly valve comprises a rotational disc, which has a smaller area than the cross-section of the recycle line at the location of the butterfly valve.

4. The reactor of claim 1, wherein the butterfly valve is arranged downstream of the heat-exchanger.

5. The reactor of claim 1, wherein the centrifugal compressor is arranged upstream of the heat-exchanger.

6. The reactor of claim 1, wherein the recycle line is further equipped with a cyclone upstream of the centrifugal compressor and the heat-exchanger.

7. The reactor of claim 1, wherein the reactor is a fluidized-bed reactor.

8. The reactor of claim 1, wherein the reactor is a multizone circulating reactor,
wherein a first polymerization zone is a riser, wherein growing polyolefin particles flow upwards under fast fluidization or transport conditions, and
a second polymerization zone is a downcomer, wherein the growing polyolefin particles flow downward in a densified form,
wherein the riser and the downcomer are interconnected and polyolefin particles leaving the riser enter the downcomer and polyolefin particles leaving the downcomer enter the riser, thereby establishing a circulation of polyolefin particles through the riser and the downcomer.

9. The reactor of claim 1, wherein the reactor is part of a reactor cascade.

10. The reactor of claim 9, wherein the reactor cascade comprises
a first gas-phase reactor and
a subsequent second gas-phase reactor having a side line, wherein the side line branches off the recycle line of the second gas-phase reactor, and serves as transfer line for transferring polyolefin particles from the first gas-phase reactor to the second gas-phase reactor.

11. A process for preparing an olefin polymer comprising:
homopolymerizing an olefin or copolymerizing an olefin and one or more other olefins at temperatures of from 20 to 200° C. and pressures of from 0.5 to 10 MPa in the presence of a polymerization catalyst,
wherein the polymerization is carried out in the gas-phase polymerization reactor of claim 1.

12. The process of claim 11, wherein the polymerization is carried out at a pre-determined pressure differential across the centrifugal compressor and variations of the recycle gas flow rate are carried out by varying the position of the guide vanes and the position of the butterfly valve.

13. The process of claim 11, wherein the recycle line has a side line,
wherein (a) the side line branches off the recycle line at a position between the centrifugal compressor and the butterfly valve and is equipped with a control valve for controlling the flow rate of the branched-off recycle gas in the side line and (b) the pressure in the side line upstream of the control valve is from 0.01 MPa to 0.2 MPa higher than the pressure in the recycle line downstream of the butterfly valve.

14. The process of claim 11, wherein the polymerization is a homopolymerization of ethylene or a copolymerization of ethylene and one or more other olefins selected from the group consisting of 1-butene, 1-hexene and 1-octene or the polymerization is a homopolymerization of propylene or a copolymerization of propylene and one or more other olefins selected from the group consisting of ethylene, 1-butene and 1-hexene.

15. The process of claim 14, wherein the resulting polyolefin is a high density polyethylene having a density determined according to ISO 1183 at 23° C. from 0.945 to 965 g/cm$^3$.

16. The process of claim 11, wherein the recycle line has a side line,
wherein the side line branches off the recycle line at a position between the centrifugal compressor and the butterfly valve and is equipped with a control valve for controlling the flow rate of the branched-off recycle gas in the side line.

17. The process of claim 11, wherein the reactor is a fluidized-bed reactor.

18. The process of claim 11, wherein the reactor is a multizone circulating reactor,
wherein a first polymerization zone is a riser,
wherein growing polyolefin particles flow upwards under fast fluidization or transport conditions, and
a second polymerization zone is a downcomer,
wherein the growing polyolefin particles flow downward in a densified form,
wherein the riser and the downcomer are interconnected, the polyolefin particles leaving the riser enter the downcomer, and the polyolefin particles leaving the downcomer enter the riser,
thereby establishing a circulation of polyolefin particles through the riser and the downcomer.

19. The process of claim 11, wherein the reactor is part of a reactor cascade.

20. The process of claim 19, wherein the reactor cascade comprises
a first gas-phase reactor and
a subsequent second gas-phase reactor having a side line,
wherein the side line branches off the recycle line of the second gas-phase reactor and serves as the transfer line for transferring polyolefin particles from the first gas-phase reactor to the second gas-phase reactor.

* * * * *

UNITED STATES PATENT AND TRADEMARK OFFICE
CERTIFICATE OF CORRECTION

| | |
|---|---|
| PATENT NO. | : 11,078,307 B1 |
| APPLICATION NO. | : 16/967387 |
| DATED | : August 3, 2021 |
| INVENTOR(S) | : Baita et al. |

It is certified that error appears in the above-identified patent and that said Letters Patent is hereby corrected as shown below:

On the Title Page

Column 1, Item (30), Line 1, delete "18155559" and insert -- 18155559.0 --, therefor In the Specification In Column 13, Line 30, delete "$MFR_{1902.16}$" insert -- $MFR_{190/2.16}$ --

In Column 14, Line 22, delete "$MFR_{1902/2.16}$" insert -- $MFR_{190/2.16}$ --

Signed and Sealed this
Thirty-first Day of January, 2023

Katherine Kelly Vidal
*Director of the United States Patent and Trademark Office*